(12) United States Patent
Dinh et al.

(10) Patent No.: US 6,650,556 B2
(45) Date of Patent: Nov. 18, 2003

(54) MULTI-PHASE DC—DC CONVERTER

(75) Inventors: James S. Dinh, Gig Harbor, WA (US); Gerald A. Budelman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/000,737

(22) Filed: Oct. 31, 2001

(65) Prior Publication Data

US 2003/0081438 A1 May 1, 2003

(51) Int. Cl.$^7$ .............................. H02M 7/00; G05F 1/40
(52) U.S. Cl. ..................... 363/65; 363/124; 323/282
(58) Field of Search .................... 363/127, 65, 56, 363/52, 54, 124; 323/282, 284, 306, 222, 285; 307/66, 48

(56) References Cited

U.S. PATENT DOCUMENTS

| | | | | |
|---|---|---|---|---|
| 5,270,589 A | * | 12/1993 | Sawada et al. ............. 307/475 |
| 5,592,072 A | * | 1/1997 | Brown ....................... 323/268 |
| 5,870,296 A | * | 2/1999 | Schaffer ...................... 363/65 |
| 5,892,389 A | * | 4/1999 | Lai .............................. 327/543 |
| 6,031,702 A | * | 2/2000 | Williams ...................... 361/87 |
| 6,031,743 A | * | 2/2000 | Carpenter et al. ............ 363/65 |
| 6,035,261 A | * | 3/2000 | Carpenter et al. ............ 782/59 |
| 6,055,167 A | * | 4/2000 | Shamkovich et al. ......... 363/52 |
| 6,362,608 B1 | * | 3/2002 | Ashburn et al. ............. 323/272 |
| 6,404,175 B1 | * | 6/2002 | Yang et al. ................. 323/282 |

* cited by examiner

*Primary Examiner*—Rajnikant B. Patel
(74) *Attorney, Agent, or Firm*—Trop, Pruner & Hu, P.C.

(57) ABSTRACT

A multi-phase DC—DC converter having redundant DC—DC phases or modules. If a DC—DC phase fails, such as from a short circuit, it is decoupled from the output of the DC—DC converter. In some embodiments, the other DC—DC phases bear the burden of the extra power output. In other embodiments, additional DC—DC phases are coupled in, in response to the failure.

24 Claims, 5 Drawing Sheets

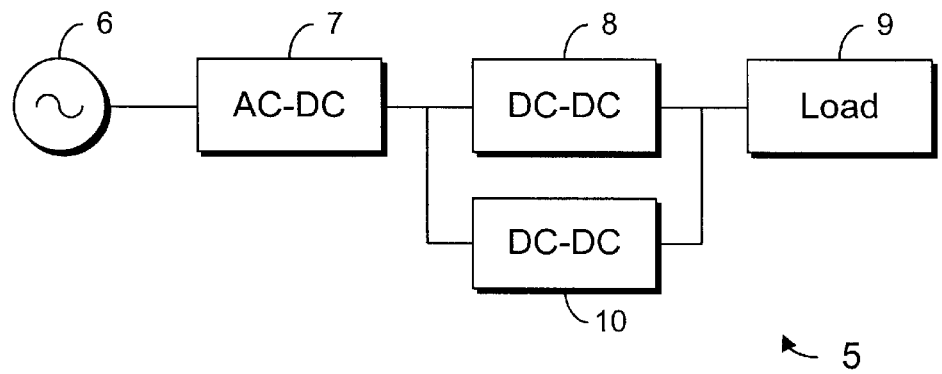
Fig. 1A - prior art
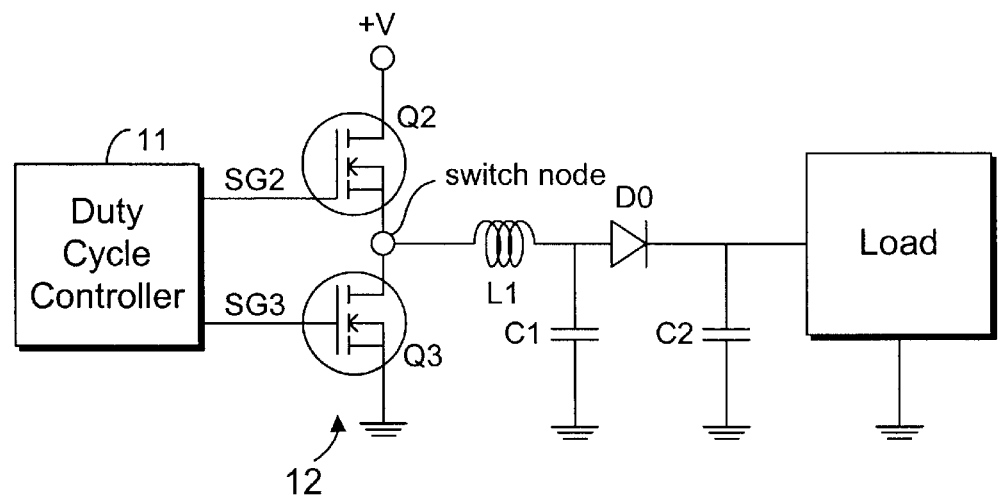
Fig. 1B - prior art

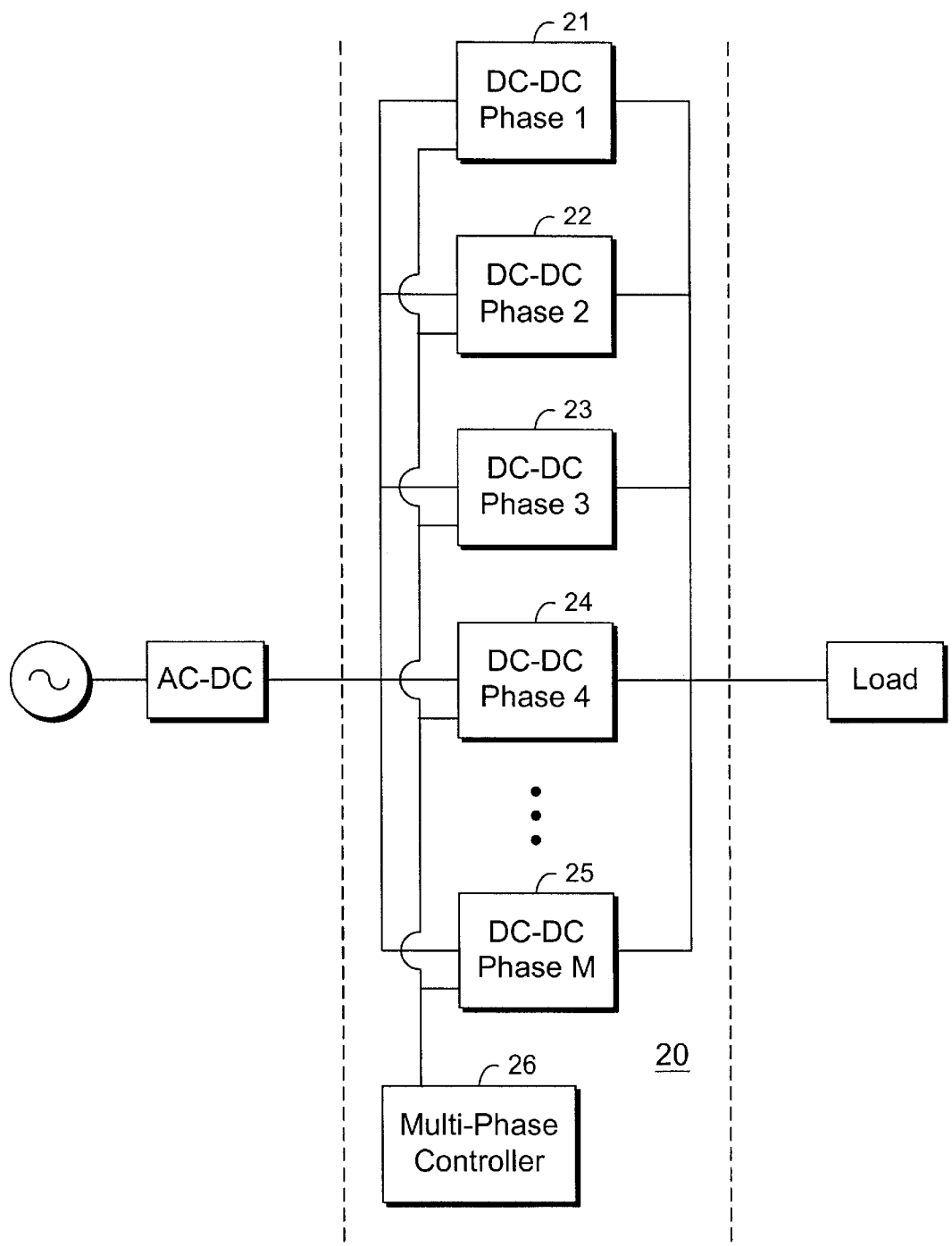
Fig. 2 - prior art

MULTI-PHASE DC— DC CONVERTER

BACKGROUND OF THE INVENTION

1. Technical Field of the Invention

The present invention relates generally to DC—DC converters and voltage regulators, and more specifically to a multi-phase DC—DC converter having redundant DC—DC phases or modules isolated by short protection mechanisms.

2. Background Art

FIG. 1A shows a simplified example of an electronic system 5 according to the prior art. The system is powered by an AC source 6, to which is connected an AC-DC converter 7. One component of a DC-powered electronic system which is known to be subject to various types of failures, is the DC—DC converter 8, whose primary function is typically to step the DC voltage down from e.g. 12 volts provided by the AC-DC converter to 5 volts or 3.3 volts or whatever is required by the particular load 9 for which the system is designed. Therefore, in previous systems it has been known to provide a redundant or duplicate DC—DC converter 10 in parallel with the primary DC—DC converter 7. This is commonly known as "N+1 redundancy". Unfortunately, this seldom-used protection has meant doubling the cost of the DC—DC converter portion of the system.

FIG. 1B shows an exemplary DC—DC converter 8 (or 10), such as may be used in the system of FIG. 1A. The DC—DC converter 8 includes a duty cycle controller 11 which provides duty cycle control signals SG2 and SG3 to respective switches Q2 ("top switch") and Q3 ("bottom switch") of a synchronous multi-phase buck regulator 12. The top switch Q2 is often called a pass switching element, and the bottom switch Q3 is often called a synchronous switching element. The output of the regulator 12 is taken from the switch node between the two switches, and is fed to an inductor L1 which stores energy and feeds into a diode DO which prevents current from returning into the regulator from the load. The inductor L1 and capacitor C1 smooth the provided voltage and amperage over time. A capacitor C2 is coupled across the load to assist the regulator by providing current in response to changing demands from the load.

James Dinh is co-inventor of the present invention and is the inventor of a related invention disclosed in U.S. Pat. No. 6,262,566 "DC-to-DC Controller Having a Multi-Phase Synchronous Buck Regulator" which issued Jul. 17, 2001. Both this patent and that one are assigned to Intel Corporation.

FIG. 2 shows a simplified, exemplary electronic system according to the '566 patent. In that system, the DC—DC converter is split into multiple phases 1-M (elements 21 to 24), which are controlled by a multi-phase controller 26. In general, the phases 1-M are out of phase with each other. Each DC—DC phase contributes to the overall output current provided to the load. The multi-phase controller sequences the phases to reduce ripple at the input and the output.

In the system of FIG. 1A, if the main DC—DC unit 8 fails, the N+1 redundant DC—DC unit 10 is there to continue powering the load. In the system of FIG. 2, if any of the DC—DC phases fails, either the load will be underpowered, or the remaining DC—DC phases will have to work harder to make up for the lost DC—DC phase(s). This may lead to premature failure of the overall DC—DC system, as the surviving DC—DC phases may have to work beyond their design parameters. In some cases, loss of one or more DC—DC phases may even result in a domino effect that takes down the other DC—DC phases, resulting in a loss of power to the load, or perhaps even destruction of the load.

If one were willing to bear the cost of doubling-up the DC—DC componentry, one could impose the FIG. 1A N+1 thinking on the FIG. 2 system, and have two complete sets of DC—DC converter 20 in an N+1 redundant system.

The present invention, however, offers a more insightful, efficient, and inexpensive solution.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 1A illustrates an electronic system having a redundant DC—DC power supply, according to the prior art.

FIG. 1B illustrates an electronic system powered by a synchronous multi-phase buck regulator, according to the prior art.

FIG. 2 illustrates an electronic system having a multi-phase DC—DC power supply, according to the prior art.

DETAILED DESCRIPTION

Figure 3:
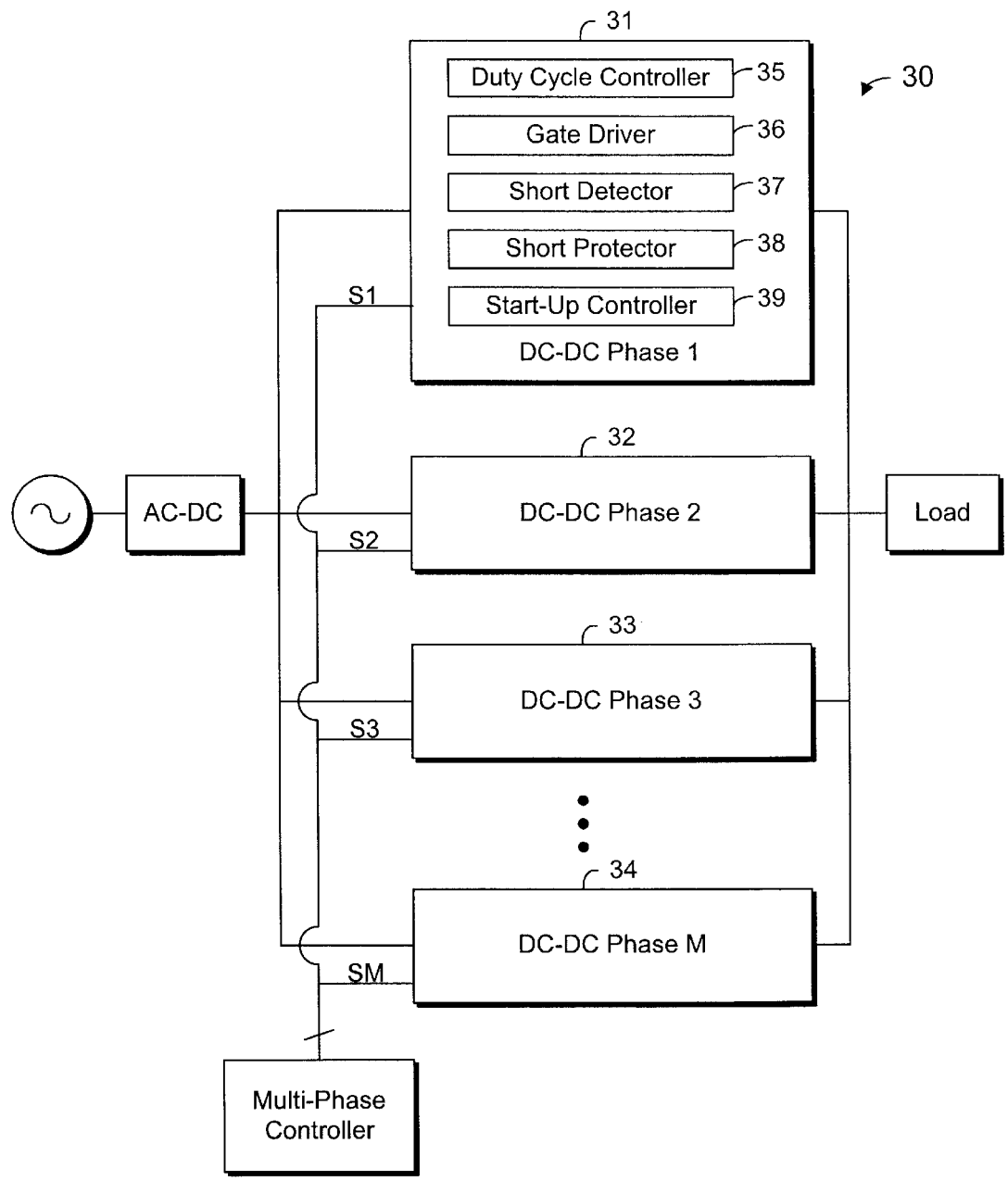
FIG. 3 illustrates an electronic system having a short-protected multi-phase DC—DC power supply, according to one embodiment of this invention.

FIG. 3 shows a system powered by one embodiment of the short-protected multi-phase DC—DC power supply 30 of this invention. The power supply includes two or more DC—DC phases, illustrated here as DC—DC phase 1 (31), DC—DC phase 2 (32), DC—DC phase 3 (33), up to DC—DC phase M (34). The reader will appreciate that any suitable number of phases may be employed. As in the prior art, the phases are powered by an AC-DC converter and are under the control of a multi-phase controller, to power a load. Each DC—DC phase receives its own synchronization signal S1 through SM, also known as switching signals, from the multi-phase controller.

DC—DC phase 1 illustrates details which may also be present in the other DC—DC phases. DC—DC phase 1 includes a duty cycle controller 35, a gate driver 36, a short detector 37, a short protector 38, and a start-up controller or circuit 39. In some embodiments, all DC—DC phases are of identical construction, while in other embodiments, they may differ from each other. In some embodiments, various of the sub-components shown may be optional, redundantly provided, and so forth.

Figure 4:
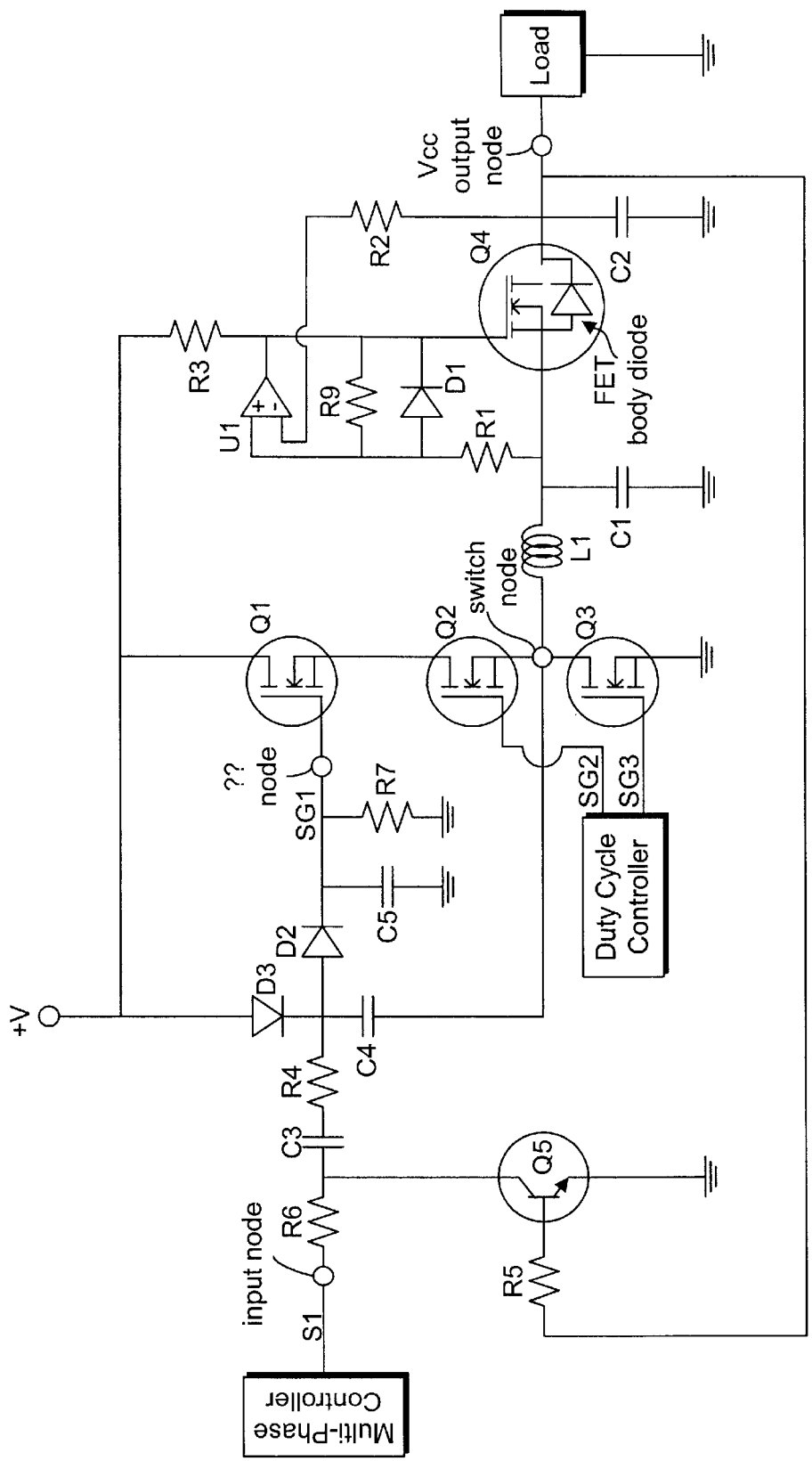
FIG. 4 illustrates one embodiment of the short-protected multi-phase DC—DC power supply of this invention.

FIG. 4 shows one exemplary embodiment of such a DC—DC phase (40). The reader will appreciate that there are many ways and circuits in which the principles of this invention may be constructed, and that the specific circuitry shown in FIG. 4 is only by way of illustration and not limitation.

The DC—DC phase receives its respective synchronization or switching signal (in this example S1) from the multi-phase controller at an input node. The synchronization signal is routed through an RC network (R6, C3, R4) and through a diode D2, at which point it is regarded as signal SG1, which is to the input node of a top detector shutdown switch Q1. The switching signal SG1 turns the shutdown switch Q1 and keeps it on in the normal operating mode, and turns the shutdown switch Q1 off if top switch Q2 or the bottom switch Q3 fail short. The top detector shutdown switch is connected to the +V power rail input and to the synchronous multi-phase buck regulator, which includes top switch Q2 and bottom switch Q3. As in the prior art, the duty cycle control signals SG2 and SG3 are provided from the duty cycle controller to the gates of the top and bottom switches.

In a system in which the +V output of the AC-DC converter is 12 volts, and the desired Vcc voltage output to the load is 1.2 volts, the duty cycle controller would provide a 10% duty cycle, in which SG2 is held active for 10% and inactive for 90% of the time, while SG3 is held inactive for 10% and active for 90% of the time.

The switch node of the buck regulator is coupled through a feedback loop including a capacitor C4 to the input of the diode D2 to provide enough charge or voltage to keep the shutdown switch Q1 on in normal operating conditions.

The switch node is also coupled through an inductor L1 and the bottom detector shutdown switch Q4 to the output node of the DC—DC phase, where it provides Vcc to the load. The bottom detector shutdown switch is connected so as to enable its FET body diode to provide the protection against current reversal which was provided in FIG. 1B by diode D0. However, because the body diode will be shorted out by the FET Q4 when the FET Q4 is on in normal operating conditions, the FET Q4 offers very low impedance so it will only produce a tiny fraction of the heat, and consume only a tiny fraction of the power as compared to the prior diode solution (DO of FIG. 1B).

In operation, if the buck regulator's top switch Q2 suffers a failure in which it shorts out and becomes, in essence, a wire connecting the switch node to the +V rail (which would, in a prior art system, likely destroy the load by coupling it to +V rather than the much lower Vcc), the top switch detector shutdown switch Q1 activates by becoming an "open", isolating the top switch, switch node, and the load from the +V rail. If Q2 shorts, the gate of Q1 goes low and discharges, turning off Q1, which isolates Q2.

Similarly, if the buck regulator's bottom switch Q3 suffers a shorting failure, the bottom detector shutdown switch Q4 isolates the load from the buck regulator. Or, more to the point, the bottom detector shutdown switch isolates the failed buck regulator's output from those of the other DC—DC phases (shown in FIG. 3), which might shut down the system or otherwise cause their destruction as they would have a direct output path to ground. A comparator U1 monitors the voltage across the bottom detector shutdown switch Q4, and if Q3 shorts and causes a back-current to feed from the load into the DC—DC phase, the comparator turns off the bottom detector shutdown switch, isolating this DC—DC phase. In this case, the diode D1 provides latching to keep the bottom detector shutdown switch off, preventing it from cycling on and off. Resistors R1 and R9 provide hysteresis to help eliminate false triggering of the comparator.

Because at start-up the regulator is not yet in full operation, the switch node is not yet switched, so it cannot provide the boost voltage (a square wave) to C4, through a diode D2 to keep Q1 on. After the regulator is up and running, the switch node will provide enough boost voltage to sustain and keep Q1 on through C4, D2, then Q5 turns S1 off by closing and providing a path to ground so the S1 pulse is fed to ground and isolated from the rest of the circuit shown in FIG. 4, but the S1 pulse is still fed to the gate driver circuit (not shown in FIG. 4, but shown as 36 in FIG. 3).

At startup, the S1 signal is a positive-going pulse, which goes through the resistor R6 and coupled through the capacitor C3 and charges the capacitor C4, presenting a voltage higher than +V at the junction of diodes D2 and D3. This voltage goes on through diode D2 to the gate of Q1, turning on Q1 and providing the pass element Q2 with the +V voltage. As the converter begins to run normally, the capacitor C4 couples the switching voltage to provide a boost voltage to drive the gate of Q1. When the output voltage Vcc rises above 0.6 volts (a junction drop), Q5 turns on and disables the startup voltage. If a pass element fault occurs, the pulse occurring at the source of Q2 will be interrupted and the boost voltage will be drained off by resistor R7, turning off Q1.

If a pass element has a failure, its series element will shut down, and will then shut down the phase pass element. If a synchronous element has a failure, the phase pass element will shut down and the series element will shut down.

Figure 5:
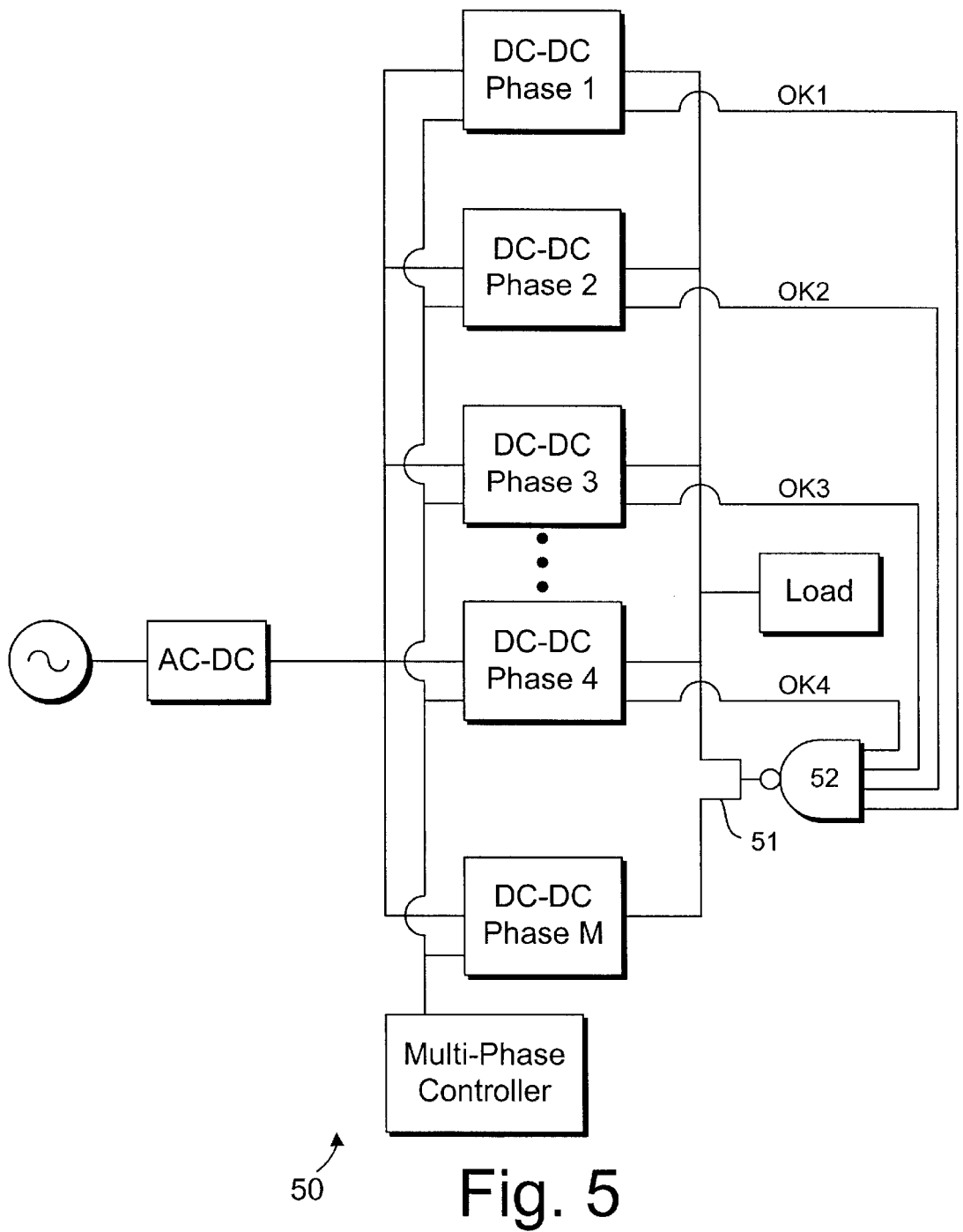
FIG. 5 illustrates another embodiment of the invention, in which a redundant DC—DC phase is ordinarily decoupled from the load.

FIG. 5 shows another embodiment 50 of the invention, in which one or more of the redundant DC—DC phases are ordinarily decoupled from the load and are kept in reserve, for use in case another DC—DC phase fails. For simplicity of illustration, FIG. 5 shows only a single DC—DC phase M having this mechanism for being held in reserve. In one embodiment, the power output of the redundant DC—DC phase M is coupled to the load through a switch 51, which is activated in response to one or more of the other DC—DC phases. In one such embodiment, "OK" or "running normally" outputs OK1–OK4 of these other DC—DC phases are active high and control the switch via a NAND gate 52. In this mode, if any of the DC—DC phases suffers a failure, its OK signal will drop to ground, and the output of the NAND gate will go high, turning on the switch. In one such embodiment, the SG1 signals (as illustrated in FIG. 4) of the non-reserve phases may be used as the OK signals.

The reader will appreciate that this is only one simplistic method of holding one or more of the DC—DC phases in reserve. This method enables the reserve DC—DC phases to be up and running prior to their being called into action, yet prevents them from consuming significant power, which limits wear and tear on their devices. In other embodiments, it may be desirable to keep the reserve units completely inactive until they are needed, to further reduce power consumption.

The reader should appreciate that drawings showing methods, and the written descriptions thereof, should also be understood to illustrate machine-accessible media having recorded, encoded, or otherwise embodied therein instructions, functions, routines, control codes, firmware, software, or the like, which, when accessed, read, executed, loaded into, or otherwise utilized by a machine, will cause the machine to perform the illustrated methods. Such media may include, by way of illustration only and not limitation: magnetic, optical, magneto-optical, or other storage mechanisms, fixed or removable discs, drives, tapes, semiconductor memories, organic memories, CD-ROM, CD-R, CD-RW, DVD-ROM, DVD-R, DVD-RW, Zip, floppy, cassette, reel-to-reel, or the like. They may alternatively include down-the-wire, broadcast, or other delivery mechanisms such as Internet, local area network, wide area network, wireless, cellular, cable, laser, satellite, microwave, or other suitable carrier means, over which the instructions etc. may be delivered in the form of packets, serial data, parallel data, or other suitable format. The machine may include, by way of illustration only and not limitation: microprocessor, embedded controller, PLA, PAL, FPGA, ASIC, computer, smart card, networking equipment, or any other machine, apparatus, system, or the like which is adapted to perform functionality defined by such instructions or the like. Such drawings, written descriptions, and corresponding claims may variously be understood as representing the instructions etc. taken alone, the instructions etc. as organized in their particular packet/serial/parallel/etc. form, and/or the instructions etc. together with their storage or carrier media. The reader will further appreciate that such instructions etc. may be recorded or carried in compressed, encrypted, or rag otherwise encoded format without departing from the scope of this patent, even if the instructions etc. must be decrypted, decompressed, compiled, interpreted, or otherwise manipulated prior to their execution or other utilization by the machine.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A DC—DC regulator comprising:
    a plurality of DC—DC phases, at least one of which includes,
        a regulator, and
        a detector shutdown switch coupled to isolate the regulator in response to the regulator having a short-circuit failure;
    a redundant DC phase; and
    a circuit to connect the redundant DC phase in response to the short-circuit failure in the at least one of the DC phases.

2. The DC—DC regulator of claim 1 wherein the detector shutdown switch comprises:
    a top detector shutdown switch.

3. The DC—DC regulator of claim 1 wherein the detector shutdown switch comprises:
    a bottom detector shutdown switch.

4. The DC—DC regulator of claim 1 wherein the detector shutdown switch comprises:
    a top detector shutdown switch; and
    a bottom detector shutdown switch.

5. The DC—DC regulator of claim 1 wherein the detector shutdown switch is coupled to isolate the regulator from a load.

6. The DC—DC regulator of claim 1 wherein the detector shutdown switch is coupled to isolate the regulator from a regulator of another of the DC—DC phases.

7. The DC—DC regulator of claim 1 wherein the detector shutdown switch comprises:
    a field-effect transistor (FET) having a FET body diode coupled to inhibit current flow from a load back into the DC—DC regulator.

8. The DC—DC regulator of claim 1 wherein the regulator comprises:
    a synchronous multi-phase buck regulator; and
    a duty cycle controller coupled to provide duty cycle signals to the synchronous multi-phase buck regulator.

9. The DC—DC regulator of claim 1 further comprising:
    a multi-phase controller coupled to provide respective switching signals to the plurality of DC—DC phases.

10. The DC—DC regulator of claim 9 further comprising:
    a startup controller.

11. A synchronous multi-phase buck regulator to provide DC voltage to a load and comprising:
    a top switch;
    a switching node;
    a bottom switch coupled to the top switch at the switching node;
    an output node to be coupled to the load;
    a first shutdown switch coupled in series between the switching node and the output node, the first shutdown switch comprising a field-effect transistor (FET) having a FET body diode coupled to inhibit current flow from the output node to the switch node; and
    a comparator having inputs coupled across the FET and an output coupled to a gate of the FET.

12. The synchronous multi-phase buck regulator of claim 11 further comprising:
    a resistor coupled in series between the FET and an input of the comparator.

13. The synchronous multi-phase buck regulator of claim 12 further comprising:
    another resistor coupled in series between the FET and another input of the comparator.

14. The synchronous multi-phase buck regulator of claim 12 further comprising:
    a diode coupled between an input of the comparator and the gate of the FET.

15. The synchronous multi-phase buck regulator of claim 11 to generate the DC voltage from another DC voltage, and further comprising:
    an input node to receive the other DC voltage; and
    a second shutdown switch coupled between the input node and the top switch.

16. The synchronous multi-phase buck regulator of claim 11 further comprising:
    a phase control input to receive a switching signal; and
    a third switch coupled to the output node and the phase control input node to inhibit the switching signal in response to the synchronous multi-phase buck regulator achieving a normal state of operation.

17. An electronic system comprising:
    a load having an input; and
    a DC—DC converter including, a duty cycle controller, and a plurality of DC—DC phases, each including, a buck regulator having an input coupled to the duty cycle controller and having a switch node coupled to the input of the load, a top shutdown switch coupled to the buck regulator, and a bottom shutdown switch coupled to the buck regulator;

the plurality of DC—DC phases comprising a plurality of normal operation DC—DC phases; and at least one reserve DC—DC phase.

18. The electronic system of claim 17 further comprising:

an AC-DC converter coupled to the DC—DC converter.

19. The electronic system of claim 18 wherein:

the bottom shutdown switch comprises a field effect transistor (FET) having a FET body diode coupled to inhibit current flow from the load to the buck regulator.

20. An article of manufacture comprising:

a machine-accessible medium having thereon data which, when accessed by a machine, enable the machine to create a semiconductor device including, a multi-phase DC—DC converter including, a synchronous multi-phase buck regulator, and a shutdown switch coupled to the buck regulator to defeat the buck regulator in response to the buck regulator suffering a short circuit.

21. The article of manufacture of claim 20 wherein the machine-accessible medium has additional data that, when accessed by the machine, enable the machine to include in the multi-phase DC—DC converter:

a field-effect transistor (FET) having a FET body diode coupled to inhibit current flow from a load back into an output of the buck regulator.

22. The article of manufacture of claim 21 wherein the machine-accessible medium has additional data that, when accessed by the machine, enable the machine to include in the multi-phase DC—DC converter:

a reserve DC—DC phase in the multi-phase DC—DC converter.

23. The article of manufacture of claim 21 wherein the machine-accessible medium comprises a recording medium.

24. The article of manufacture of claim 21 wherein the machine-accessible medium comprises a communication link and the data comprise a carrier wave traversing the communication link.

\* \* \* \* \*